No. 664,254. Patented Dec. 18, 1900.
F. GARDNER.
SOD CUTTING ATTACHMENT FOR PLOWS.
(Application filed Aug. 25, 1900.)
(No Model.)
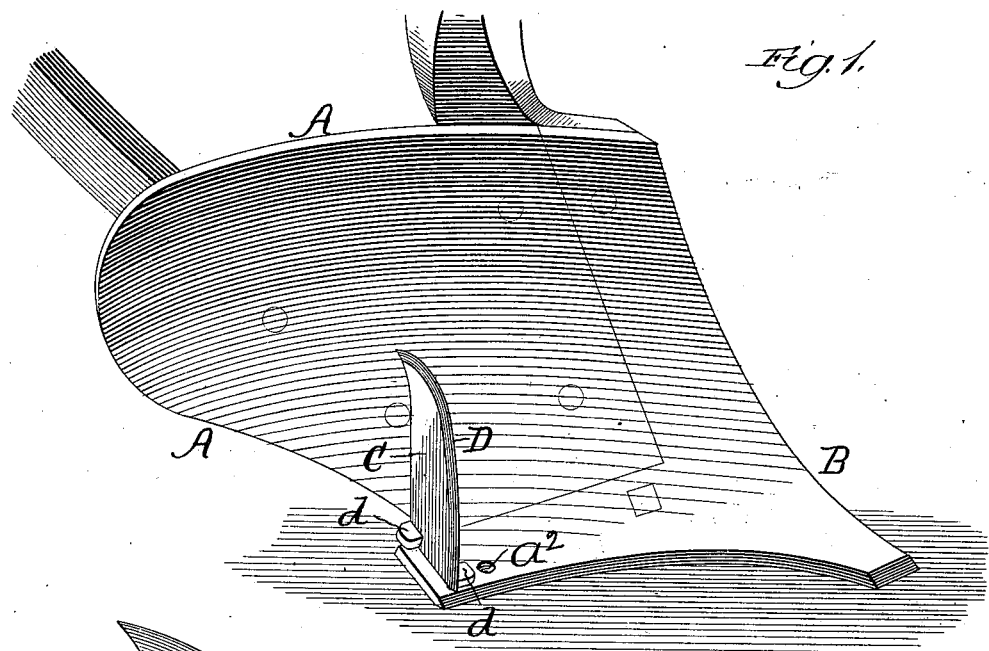
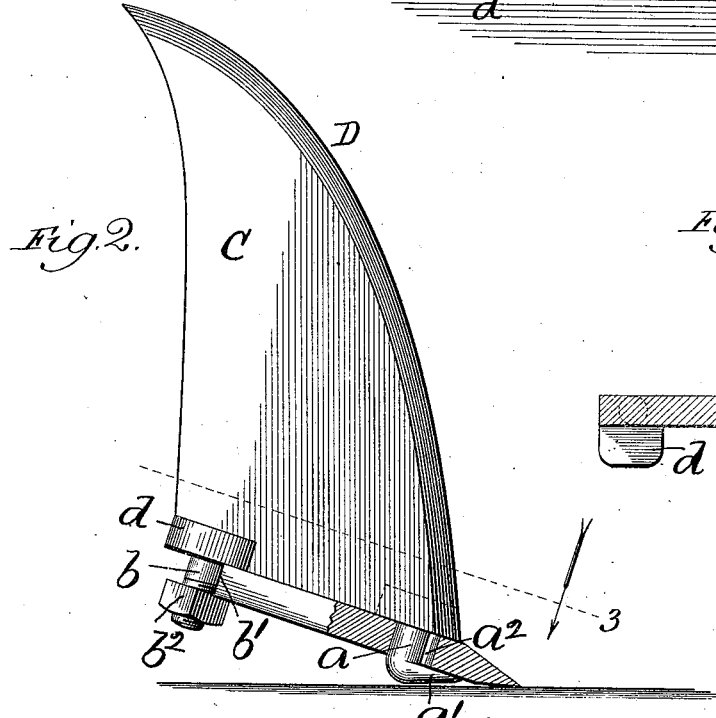
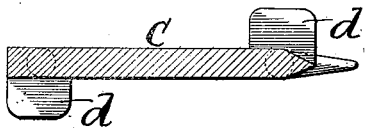
Witnesses:
Inventor:
F. Gardner.
By L. B. Coupland & Co.
Attys.

UNITED STATES PATENT OFFICE.

FREDERICK GARDNER, OF THORNTON, ILLINOIS.

SOD-CUTTING ATTACHMENT FOR PLOWS.

SPECIFICATION forming part of Letters Patent No. 664,254, dated December 18, 1900.

Application filed August 25, 1900. Serial No. 27,967. (No model.)

*To all whom it may concern:*

Be it known that I, FREDERICK GARDNER, a citizen of the United States, residing at Thornton, in the county of Cook and State of Illinois, have invented certain new and useful Improvements in Sod-Cutting Attachments for Plows; and I do hereby declare the following to be a full, clear, and exact description of the invention, such as will enable others skilled in the art to which it appertains to make and use the same.

This invention relates to a sod or earth cutting attachment for plows, and has for its object to provide a device of this character that may be adjustably secured to the opposite side of the share from the landside.

In the accompanying drawings, Figure 1 is an elevation in perspective of a moldboard and plowshare, showing the relative position of the attachment, the plow-frame being broken away. Fig. 2 is a side elevation of the cutting attachment, the portion of the share shown in this figure being in part section; and Fig. 3 is a horizontal section on line 3, Fig. 2, looking in the direction indicated by the arrow.

A may represent a moldboard, B a plowshare, and C the sod-cutting blade. The cutting-blade, as shown, is placed in a vertical position on the opposite side of the share from that of the usual colter or cutter supported from the plow-beam and may be used jointly therewith or independently, as circumstances may require. The lower end of the cutter is provided adjacent to the front cutting edge with a downwardly-projecting attaching-bolt $a$, terminating in the horizontal hook end $a'$. The share is provided with one or more apertures $a^2$ for the insertion of the hook-bolt $a$ from the upper side. The lower end of the cutting-blade is provided at the back side with a downwardly-projecting clamping-bolt $b$, which is adapted to engage with the back edge of the share, as at $b'$. The lower portion of this bolt is threaded for the engagement of the clamping-nut $b^2$. Plowshares are of different forms, and when it is not convenient to clamp on the back edge holes may be provided in the share for the engagement of the bolt $b$. A number of apertures may be provided, so that the cutter can be set nearer or farther away from the landside in accordance with the width of the path or furrow-slice to be cut.

The base of the cutter is provided on opposite sides with companion lugs $d$, which are adapted to have a bearing on the surface of the share and guard against a lateral strain in holding the cutter in its upright working position.

The cutter gradually narrows from the base to the top and presents an inclined backwardly-curved cutting edge D and provides for a shearing cut, so that the sod and roots are more easily cut than if the blade presented a straight instead of a curved cutting edge.

The cutter or blade is placed in position by first tipping the same forward and then inserting the attaching-bolt $a$. Then tip the blade back, which brings the hook $a'$ to a retaining-bearing against the under side of the share and at the same time brings the clamping-bolt $b$ into its engaging position for the reception of its clamping-nut. By this means the cutting-blade is firmly mounted on the share in its working position. This arrangement provides means for cutting the sod on both sides of the furrow when used in connection with the ordinary beam-colter or sod-cutter.

I claim—

1. In a plow, the combination with a share, of a cutting-blade, mounted on the opposite side thereof from the landside, substantially as described.

2. In a plow, the combination with a share, provided with one or more apertures, of a cutting-blade, having a backwardly-curved cutting edge and adjustably mounted on the furrow side of said share, substantially as described.

3. In a plow, the combination with a share, of a sod or earth cutting blade, mounted on the furrow side thereof, and means for securing said blade in its working position, substantially as described.

4. In a plow, the combination with a share, of a cutting-blade, provided on the lower end with attaching-bolts and companion bearing-lugs, and adapted to be mounted on the furrow side of said share, substantially as described.

In testimony whereof I affix my signature in presence of two witnesses.

FREDERICK GARDNER.

Witnesses:
L. M. FREEMAN,
L. B. COUPLAND.